(12) United States Patent
Goode

(10) Patent No.: US 7,327,675 B1
(45) Date of Patent: Feb. 5, 2008

(54) FAIRNESS OF CAPACITY ALLOCATION FOR AN MPLS-BASED VPN

(75) Inventor: Burwell Goode, Weston, CT (US)

(73) Assignee: AT&T Corp., New York, NY (US)

( * ) Notice: Subject to any disclaimer, the term of this patent is extended or adjusted under 35 U.S.C. 154(b) by 1052 days.

(21) Appl. No.: 10/210,494

(22) Filed: Aug. 1, 2002

(51) Int. Cl.
G08C 15/00 (2006.01)
H04J 3/14 (2006.01)
H04L 12/56 (2006.01)

(52) U.S. Cl. .............. 370/230; 370/401; 370/468
(58) Field of Classification Search ........ 370/468, 370/230–236, 401–404; 709/238–241
See application file for complete search history.

(56) References Cited

U.S. PATENT DOCUMENTS

| | | | |
|---|---|---|---|
| 6,353,616 B1 * | 3/2002 | Elwalid et al. | 370/443 |
| 6,487,170 B1 * | 11/2002 | Chen et al. | 370/231 |
| 6,496,479 B1 * | 12/2002 | Shionozaki | 370/230 |
| 6,778,498 B2 * | 8/2004 | McDysan | 370/231 |
| 6,898,641 B1 * | 5/2005 | Kobayashi | 709/238 |
| 6,914,883 B2 * | 7/2005 | Dharanikota | 370/230.1 |
| 6,950,398 B2 * | 9/2005 | Guo et al. | 370/235 |
| 6,973,504 B2 * | 12/2005 | Nomura | 709/235 |
| 7,039,720 B2 * | 5/2006 | Alfieri et al. | 709/242 |
| 2003/0189901 A1 * | 10/2003 | Ozugur et al. | 370/230 |
| 2004/0028054 A1 * | 2/2004 | Khurana et al. | 370/395.21 |

* cited by examiner

Primary Examiner—Chau Nguyen
Assistant Examiner—Marcus R Smith

(57) ABSTRACT

A method and system for providing fairness of capacity allocation in a network is presented. The method includes intercepting RSVP messages at a PE router, counting capacity requests for reservable classes of service for each VPN on each LSP, and rejecting requests when a VPN has inadequate capacity on the specific LSP. The present method allocates capacity to MPLS VPNs fairly, so that none is starved by the greediness of other VPNs sharing the same LSP.

6 Claims, 3 Drawing Sheets

FAIRNESS OF CAPACITY ALLOCATION FOR AN MPLS-BASED VPN

CROSS REFERENCE TO RELATED APPLICATIONS

Not applicable.

BACKGROUND OF THE INVENTION

Computer networks are well known, and are used to interconnect computers at different locations so that they can share data and communicate with each other. Originally, most of the data carried on networks comprised textual data. More recently, multimedia data such as animation, voice and video clips have become more popular on the Internet. Multimedia networking products such as Internet telephony, Internet TV and video conferencing have also become popular.

The use of multimedia networking relies on hardware infrastructure, software infrastructure and application tools to support multimedia transport on networks. Multimedia networking is a relatively complex and difficult operation to accomplish. Compared with traditional textual applications, multimedia applications usually require much higher bandwidth. For example, a typical piece of 25-second 320×240 QuickTime movie could take 2.3 MB, which is equivalent to about 1000 screens of textual data.

Further, most multimedia applications require real-time traffic wherein audio and video data are played back continuously at the rate they are sampled. When the data does not arrive in time, the play back process stops and human ears and eyes can easily pick up the artifact. In Internet telephony, human beings can tolerate a latency of about 250 milliseconds. If the latency exceeds this limit users will complain about the quality of the call. In addition to the delay, network congestion also has an effect on real-time traffic. For non-real-time traffic, when the network is congested the transfer takes longer to complete. If no action is taken to remedy the congestion, the retransmission of lost packets aggravates the situation by further congesting the network. However, for real-time data transmission, if the network is congested, the real-time data becomes obsolete and is dropped if it does not arrive in time.

Networks, such as the Internet, are shared by thousands of users, and have limited bandwidth, unpredictable delay and unpredictable availability. These characteristics are in direct contrast to multimedia data which is high bandwidth, real-time and bursty by nature.

There are several known ways to transmit multimedia data, such as by utilizing dedicated links, cables and Asynchronous Transfer Mode (ATM) networks. However, it is desirable to use the Internet Protocol to transmit multimedia data, because it has become a ubiquitous protocol.

Dedicated links and cables are generally more expensive for transmitting multimedia data because they require special installation and special software. Without an existing technology like Local Area Networks (LANs) and/or Wide Area Networks (WANs), software development can be extremely expensive. While ATM may support multimedia data rates because ATM supports high bandwidth, is connection-oriented and can tailor different levels of quality of service to different type of applications, few users have ATM connections at their desktops.

On the other hand, the Internet is growing exponentially. The well-established LAN and WAN technologies based on the IP protocol suite connect bigger and bigger networks all over the world to the Internet. The Internet has become the platform of most networking activities. This is the driving force behind the development and implementation of multimedia protocols over an internet. Another benefit of running multimedia over IP is that users can have integrated data and multimedia service over a single network, without investing in another network and building an interface between networks.

Shared network resources are unpredictable in their availability. Real-time applications require adequate bandwidth when the transmission takes place. Therefore there should be some mechanism for allowing real-time applications to preempt the resources they need along the transmission path, within the limited bandwidth assigned for real-time traffic, and also there should be a mechanism to block real-time applications from using more aggregate bandwidth than was assigned for that class of traffic.

The Internet is a packet-switching network where packets are routed independently across shared networks. There is no guarantee that real-time data will reach the destination without being jumbled and jerky. Appropriate transport protocols should be used to take care of the timing issues so that audio and video data can be played back continuously with correct timing and synchronization.

The Internet carries all types of traffic, and each type of traffic has different characteristics and requirements. For example, a file transfer application requires that some quantity of data be transferred in an acceptable amount of time, while Internet telephony requires that most packets get to the receiver in less than 0.3 seconds. If enough bandwidth is available, best-effort service fulfills all of these requirements. When resources are scarce or overloaded, however, real-time traffic suffers from the congestion.

One solution for multimedia over IP is to classify all traffic, allocate priority for different applications and to make reservations. An Internet Service model named Integrated Services (IntServ) includes best-effort service and real-time service. The real-time service enables IP networks to provide quality of service (QoS) to multimedia applications. A Resource ReServation Protocol (RSVP), together with a Real-time Transport Protocol (RTP), a Real-Time Control Protocol (RTCP), and a Real-Time Streaming Protocol (RTSP), provide a working foundation for real-time services. Integrated Services allows applications to configure and manage a single infrastructure for multimedia applications and traditional applications. It is a comprehensive approach to provide applications with the type of service they need and in the quality they choose. However, IntServ makes heavy demands on the network routers, and has not been widely implemented.

Resource ReSerVation Protocol (RSVP) is a network control protocol that allows a data receiver to request a special end-to-end quality of service for its data flows. Real-time applications use RSVP to reserve necessary resources at routers along the transmission paths so that the requested bandwidth is available when the transmission actually takes place.

Reservations are implemented through two types of RSVP messages: PATH messages and RESV messages. The PATH messages are sent periodically from the sender to the multicast address. A PATH message contains a sender template (data format, source address, source port) and traffic characteristics. This information is used by receivers to find the reverse path to the sender and to determine what resources should be reserved.

RESV messages are generated by the receivers and contain reservation parameters. The reservation parameters define what packets in the flow should be used by the packet classifier. RESV messages follow the exact reverse path of PATH messages, setting up reservations for one or more senders at every node.

The reservation states that RSVP builds at the routers are dynamic in nature. The RSVP daemon sends refresh messages periodically to maintain the reservation states. The absence of a refresh message within a certain time will destroy the reservation state.

The reservation process does not actually transmit the data and provide the requested quality of service. RSVP guarantees the required network resources are available when the transmission actually takes place.

Although RSVP sits on top of IP in the protocol stack, it is not a routing protocol, but rather an Internet control protocol. RSVP relies on the underlying routing protocols to find where it should deliver the reservation requests. When the RSVP-managed flow changes its path, the routing module notifies the RSVP module of the route changes. Therefore, RSVP can quickly adjust the resource reservation to new routes.

There are several reasons for not using IntServ with RSVP for IP telephony. Although IntServ with RSVP would work on a private network with small amounts of traffic, the large number of voice calls that IP Telephony Service Providers carry on their networks would stress an IntServ RSVP system. First, the bandwidth required for RSVP messages would be a significant part of the overall traffic. Second, RSVP router code was not designed to support many thousands of simultaneous connections per router.

It should be noted, however, that RSVP is a signaling protocol, and it has been proposed for use in contexts other than IntServ. For example, RSVP-TE is a constraint-based routing protocol for establishing Label Switched Paths with associated bandwidth and specified paths in an MPLS network. RSVP has also been proposed as the call admission control mechanism for VoIP in differentiated services networks.

Since IntServ with RSVP does not scale well to support many thousands of connections, the IETF has developed a simpler framework and architecture to support differentiated services (DiffServ). The architecture achieves scalability by aggregating traffic into classifications that are conveyed by means of IP-layer packet marking using the DS field in Ipv4 or Ipv6 headers. Sophisticated classification, marking, policing, and shaping operations need only be implemented at network boundaries. Service provisioning policies allocate network resources to traffic streams by marking and conditioning packets as they enter a differentiated services-capable network, in which the packets receive a particular per-hop forwarding behavior (PHB) based on the value of the DS field.

The primary goal of differentiated services is to allow different levels of service to be provided for traffic streams on a common network infrastructure. A variety of resource management techniques may be used to achieve this, but the end result will be that some packets will receive different (e.g. better) service than others. Service providers can, for example, offer a real-time service giving priority in use of bandwidth and router queues, up to the configured amount of capacity allocated to real-time traffic.

One candidate PHB for voice service is Expedited Forwarding (EF). The objective of the EF PHB is to build a low loss, low latency, low jitter, assured bandwidth, end-to-end service through DS domains. Such a service would appear to endpoints like a point-to-point connection of "virtual leased line". Since router queues cause traffic to experience loss, jitter, and excessive latency, EF PHB tries to ensure that all EF traffic experiences either no or very small queues.

For several decades, traffic engineering and automated rerouting of telephone traffic have increased the efficiency and reliability of the PSTN. Frame relay and ATM also offer source (or "explicit") routing capabilities that enable traffic engineering. However, IP networks have relied on destination-based routing protocols that send all the packets over the shortest path, without regard to the utilization of the links comprising that path. In some cases, links can be congested by traffic that could be carried on other paths comprised of underutilized links. It is possible to design an IP network to run on top of a frame relay or ATM ("Layer 2") network, providing some traffic engineering features, but this approach adds cost and operational complexity.

MutliProtocol Label Switching (MPLS) offers IP networks the capability to provide traffic engineering as well as a differentiated services approach to voice and multimedia quality. MPLS separates routing from forwarding, using label swapping as the forwarding mechanism. The physical manifestation of MPLS is the Label Switch Router (LSR). LSRs perform the routing function in advance by creaing Label Switched Paths (LSPs) connecting edge routers. The edge router (an LSR) attaches short (four-byte) labels to packets. Each LSR along the LSP swaps the label and passes it along to the next LSR. The last LSR on the LSP removes the label and treats the packet as a normal IP packet.

MPLS LSPs can be established using Label Distribution Protocol (LDP), RSVP Traffic Engineering (RSVP-TE), or Constraint-Based LDP (CR-LDP). When using LDP, LSPs have no associated bandwidth. However, when using RSVP-TE or CR-LDP, each LSP can be assigned a bandwidth, and the path can be designated for traffic engineering purposes. MPLS traffic engineering (MPLS-TE) combines extensions to OSPF or IS-IS, to distribute link resource constraints, with the label distribution protocols RSVP-TE or CR-LDP. Resource and policy attributes are configured on every link and define the capabilities of the network in terms of bandwidth, a Resource Class Affinity string, and a traffic engineering link metric. When performing the constraint-based path computation, the originating LSR compares the link attributes received via OSPF or IS-IS to those configured on the LSP.

Differentiated Services can be combined with MPLS to map DiffServ Behavior Aggregates onto LSPs. QoS policies can be designated for particular paths. More specifically, the EXP field of the MPLS label can be set so that each label switch/router in the path knows to give the voice packets highest priority, up to the configured maximum bandwidth for voice on a particular link. When the high priority bandwidth is not needed for voice, it can be used for lower priority classes of traffic.

DiffServ and MPLS DiffServ are implemented independently of the routing computation. MPLS-TE computes routes for aggregates across all classes, and performs admission control over the entire LSP bandwidth. MPLS-TE and MPLS DiffServ can be used at the same time. Alternatively, DiffServ can be combined with traffic engineering to establish separate tunnels for different classes. DS-TE makes MPLS-TE aware of DiffServ, so that one can establish separate LSPs for different classes, taking into account the bandwidth available to each class. So, for example, a separate LSP could be established for voice, and that LSP could be given higher priority than other LSPs, but the amount of voice traffic on a link could be limited to a certain percentage of the total link bandwidth.

RSVP version 1 lacks facilities for aggregation of individual reserved sessions into a common class. IETF RFC 3175 (Aggregation of RSVP for IPv4 and IPv6 Reservations) specifies several options for aggregated reservations: One method is to use Differentiated Services mechanisms for classification and scheduling of traffic supported by aggregate reservations. "It is not only independent of the number of E2E reservations, it is also independent of the number of aggregate reservations in the aggregation region. One or more Diff-Serv DSCPs are used to identify traffic covered by aggregate reservations and one of more Diff-Serv PHBs are used to offer the required forwarding treatment to this traffic."

Sites sharing a common IP network may be divided into several subsets. A Virtual Private Net (VPN) may be defined to be a subset of sites. Two sites can only have IP connectivity if they both belong to one of these VPNs. (Note that a site may belong to more than one VPN.)

VPNs are well known in the art. One type of VPN is a Multiprotocol Label Switching (MPLS) based VPN. (Ref: IETF RFC 2547 and RFC 2547bis) An MPLS-based VPN typically includes multiple sites transmitting and receiving data across a Service Provider Backbone (SPB). Internal to the SPB are Provider Edge (PE) routers, which transmit and receive data into and out of the SPB. Routing of data from one PE to another PE within the SPB may include the use of Provider (P) routers. The P routers transmit and receive data from a PE router or another P router.

At each customer site there are devices that are used to communicate over the SPB. Those customer devices that are attached to PE routers are called Customer Edge (CE) devices. A CE device may be a computer, but typically it is a router, in which case we refer to it as a CE router. The PE router is attached to a CE device by being the endpoint of an interface or "sub-interface" (e.g., PVC, VLAN, etc.) whose other endpoint is a CE device.

Each PE router maintains several separate forwarding tables, known as VPN Routing and Forwarding tables, or VRF tables. When a PE router receives a data packet from a CE device, it looks in the VRF table associated with that CE device to determine how to route the packet. The VRF table associated with a particular CE interface contains only routes that lead to other CE interfaces (i.e., other sites) that have at least one VPN in common with the sending CE device.

CE routers transmit and receive data into and out of the customer network. These CE routers use VPNs to exchange information between customer devices at different sites. Typically, only the PE routers are aware of the VPNs. MPLS VPNs do not have defined end-to-end (CE-CE) connections, and therefore are substantially more scalable and easier to build and manage, than conventional VPNs.

MPLS VPNs offer a platform for rapid deployment of additional value-added IP services, including intranets, extranets, voice, multimedia, and network commerce. Privacy and security are provided by limiting the distribution of a VPN's routes to only those routers that are members of the VPN.

PE routers establish Label Switched Paths (LSPs) to the other PE routers. For each VPN, the VRF table in the PE router contains a label designating either a pointer to an outgoing interface on the destination PE router, or a VPN identifier to be used when the destination PE needs to look at its VRF to forward an incoming packet. The PE router places this VPN label on the packet. Then, if path to the destination PE is through a P router, the originating PE router places an LSP label on the packet, so that the VPN label becomes the inner label. Thus P routers never observe the VPN label. Typically, the penultimate Label Switch Router pops the outer label before sending the packet to the destination PE, so that the destination PE observes only the VPN label, from which it determines the outgoing interface. Then it pops the VPN label, sending the original packets to the correct destination CE router. This technology is well known in the industry.

Several VPNs may share an LSP between two PE routers. It is, therefore, possible for one VPN to transmit more than its share of traffic on an LSP, exceeding its committed rate, to the detriment of other VPNs. More specifically, the intermediate P routers do not observe the inner labels identifying a labeled packet as belonging to one or another VPN. Therefore, there is no simple way for the core of the network to determine how much capacity is being used by any of the VPNs.

In view of the foregoing it would be desirable to provide a method of allocating capacity to MPLS VPNs fairly, so that one VPN is not starved by the greediness of another VPN sharing the same LSP.

SUMMARY OF THE INVENTION

A method of providing fairness of capacity allocation in a network is presented. The method includes intercepting RSVP messages at a PE router, counting capacity requests for VPNs on an LSP, and rejecting an RSVP message when a VPN/LSP pair associated with the RSVP message has inadequate capacity.

BRIEF DESCRIPTION OF THE DRAWINGS

The invention will be better understood by reference to the following more detailed description and accompanying drawings in which.

DETAILED DESCRIPTION

Figure 1:
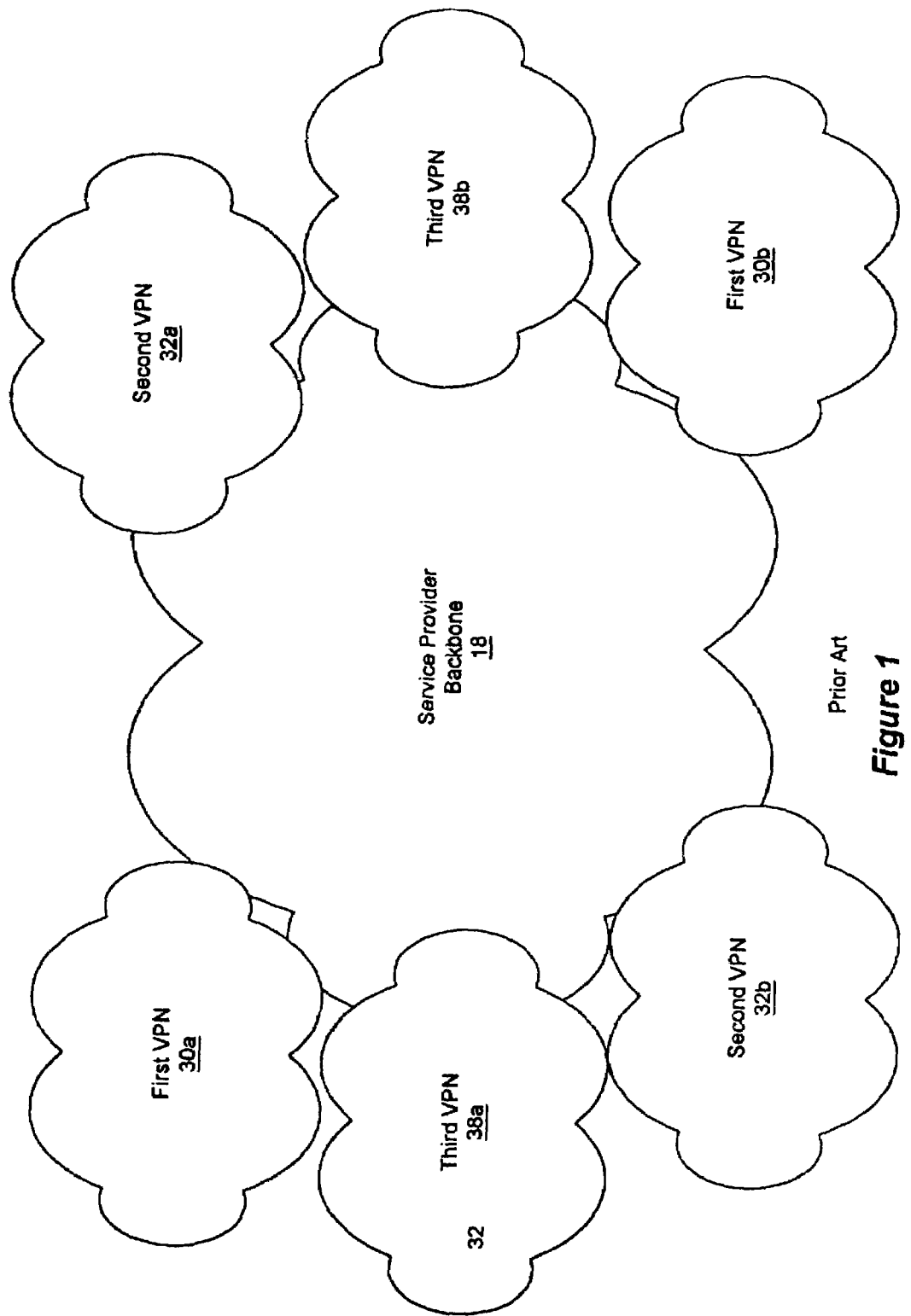
FIG. 1 is a diagram of an MPLS VPN.

With the foregoing background in mind, it is an object of the present invention to provide a method of fairly allocating capacity among MPLS-based VPNs and for a service provider to offer a guaranteed level of service to a customer.

RSVP Aggregation is a method to reserve network capacity for a tunnel, to be used by several or many microflows. RSVP is commonly used in coordination with Voice over IP call setup to determine whether there is enough capacity (network resources) for the call. RSVP at the end devices can be used in conjunction with RSVP Aggregation in the PE routers to determine whether there is enough capacity on an LSP to accommodate an additional call.

Aggregation depends on being able to hide end-to-end RSVP messages from RSVP-capable routers inside the aggregation region. This is easy to do within an LSP tunnel, since the Label Switched Routers (P routers) along the LSP will only observe and act upon the outer labels. When the PE routers act as the aggregation and deaggregation points, many of the complexities of RFC 3175 are obviated.

Call setup may be combined with RSVP in the following way: The originating customer device sends a setup message to the terminating customer device, which responds with a call proceeding message. Then the terminating customer device sends an RSVP Path message to the originating device. Since reservations are made separately in each direction, the originating device also sends an RSVP Path message to the terminating device after receiving the call proceeding message. Each customer device, upon receipt of the Path message, sends an RSVP Resv message to the originator of the Path message. If there are sufficient resources for the call, reservation confirmation will follow. Then the terminating device will ring the destination telephone. If the called party answers, the call will be connected.

On the other hand, if there are insufficient resources in either direction, a Resv Error message will be sent that will interrupt the call setup flow and cause the call to be blocked. Path Tear messages and Resv Tear messages will release any partially reserved resources.

When normal calls are disconnected, Release Complete messages and Path Tear messages are followed by Resv Tear messages that release the reserved resources.

Using the methods described in RFC 3175, it is possible to map all end-to-end reservations onto a single aggregate reservation between a given PE-PE pair. The RFC assumes the implementation of some unspecified algorithm to maintain the amount of bandwidth required on a given aggregate reservation by taking account of the sum of the bandwidths of its underlying end-to-end reservations, while changing the actual reservation infrequently.

As in basic RSVP aggregation, the token bucket parameters (defined by sender FLOWSPECS) of end-to-end reservations may be summed into the corresponding information elements in aggregate Path and Resv messages. The use of a leaky token bucket would be a version of the Guaranteed Services model. However, the Controlled Load option without the use of a token bucket model may be more appropriate. Whichever RSVP model is used, Aggregate Path messages are sent from the aggregator to the deaggregator(s) using RSVP's normal IP Protocol Number. Aggregate Resv messages are sent back from the deaggregator to the aggregator, thus establishing an aggregate reservation on behalf of the set of E2E flows that use this aggregator and deaggregator.

RSVP sends periodic refresh messages to maintain the state along the reserved path(s) In the absence of refresh messages, the state automatically times out and is deleted. RSVP aggregation also uses periodic refresh messages. This is known in the art.

This invention differs from prior art in that the PE router also keeps track of the aggregate capacity requests for each VPN separately, and rejects calls from a VPN if the required additional capacity would result in the aggregate capacity utilization of that VPN on the specific LSP exceeding the allowable amount.

Referring now to FIG. 1, a network diagram is shown having multiple VPNs and a Service Provider Backbone. The Service Provider Backbone 18 interconnects the parts of the VPN. First VPN section 30a transmits data to and receives data from first VPN section 30b across Service Provider backbone 18. Similarly, second VPN section 32a transmits data to and receives data from second VPN section 32b across Service Provider backbone 18, as do third VPN section 38A and third VPN section 38b. While three VPNs are shown, it should be understood that any number of VPNs may be established across the Service Provider Backbone 18.

Figure 2:
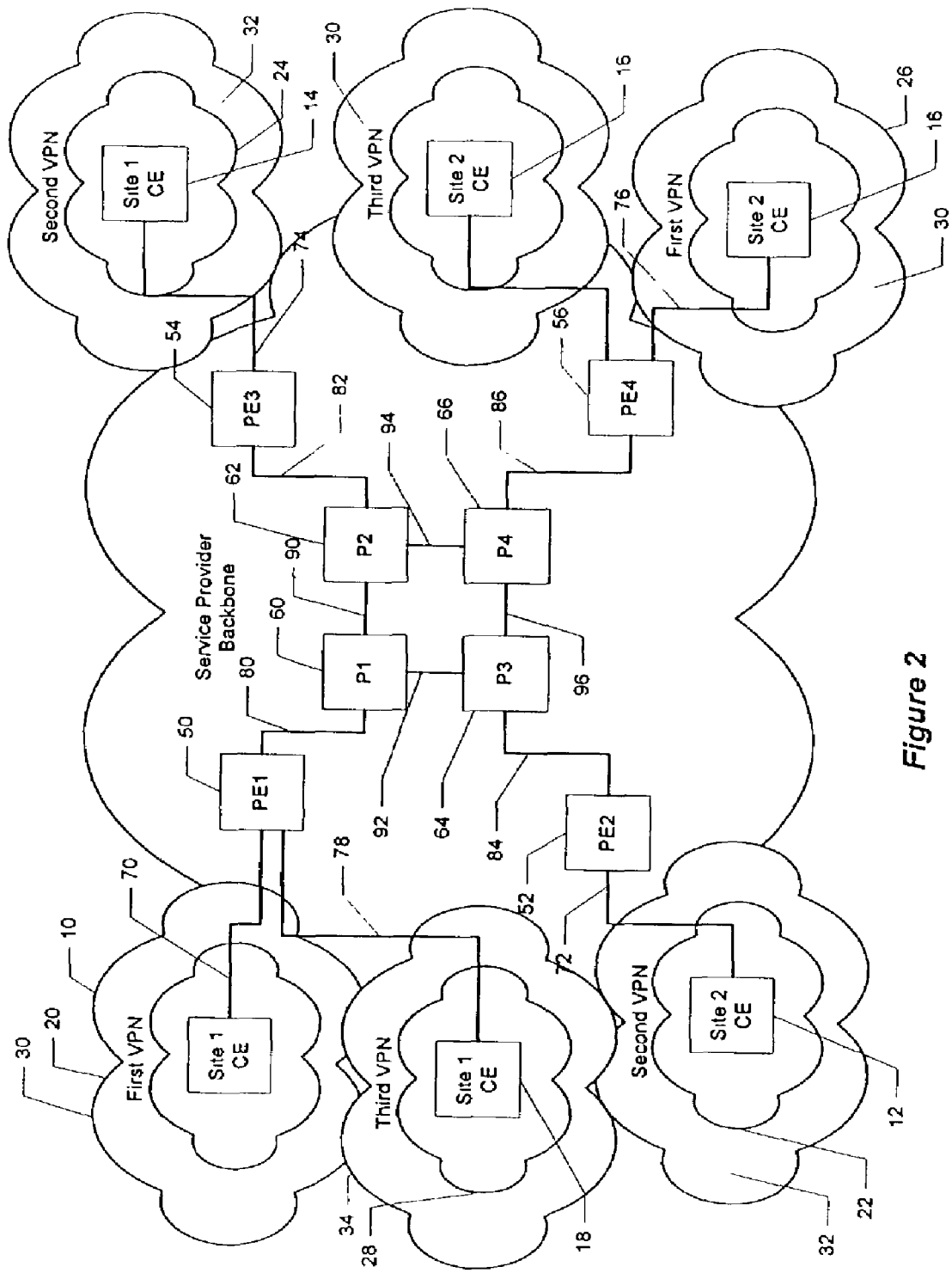
FIG. 2 is a detailed diagram of the MPLS VPN of FIG. 1.

FIG. 2 shows a detailed example of multiple VPNs with a Service Provider Backbone network. The service provider backbone network includes multiple Provider Edge (PE) routers 50, 52, 54, and 56, which are used to communicate between the backbone and the VPNs. Also shown are several Provider (P) routers 60, 62, 64 and 66 which are used to communicate data within the backbone. The P routers communicate with either another P router or with a PE router. Also shown are customer edge routers (CE) 10, 12, 14 and 16. CE routers are used to communicate between the PE routers of the Service Provider Backbone, and the respective site systems or networks.

Suppose a user wants to communicate from Site 1 of the second VPN 2 to Site 2 of the second VPN. The user equipment would transmit IP packets to the Site 1 CE router 14, which would forward the packets to PE3 router 54. The site 1 CE router 14 communicates along segment 74 to PE3 router 54. PE3 router 54 would place two labels on each packet. The inner label would identify the outgoing PE2 interface to Site 2 CE router 12. The outer label would identify the LSP through P2 router 62 to PE2 router 52.

PE3 router 54 communicates with P2 router 62 over segment 82. P2 communicates via the best available path to get to PE2, such as by communicating with P4 router 66 over segment 94, then from P4 router 66 to P3 router 64 over segment 96. The P3 router 64 would pop the outer label. The P3 router would then send the packet over segment 84 to PE2 router 52. PE2 router 52 would use the VPN label to determine the correct interface to send the packet to site 2 CE 12 over segment 72. Site 2 CE router 12 is resident within customer network 22 which is also part of second VPN 32.

Prior art MPLS-based VPNs do not facilitate the offering of a Service Level Guarantee, since it is not possible to prevent one VPN sharing a common LSP with another VPN from using some or substantially all of the capacity of the LSP, thereby limiting the other VPN. The present invention allows a VPN service provider to make a Service Level Guarantee to customers for the amount of capacity (e.g. voice capacity) available to the customer VPN while sharing LSPs with other customers.

The present invention accomplishes a fairness in the allocation of capacity on an LSP by having the PE routers intercept the RESV messages, count the aggregate requests for each VPN, and set the reject bit in the RESV message if capacity is inadequate on the VPN/LSP pair.

Alternatively, the PE routers could intercept the PATH messages, count the aggregate requests for each VPN on an LSP, and set a reject bit if the LSP capacity is inadequate. Since a typical real-time call involves one PATH message in each direction, and one RESV message in each direction, the two alternatives are equivalent in many cases. If the implementation intercepts the PATH message, then the PATH message will not pass through to the destination PE, and RSVP will not check the availability of resources beyond the destination PE (e.g., to the destination CE router). However, Call Setup might check the resources on the CE-PE link, so that end-to-end RSVP messages might not be necessary. In this case, the PE routers could intercept the PATH messages and the system would have acceptable performance. Both alternative procedures are within the scope of the invention, but hereafter, we will refer to the alternative that intercepts the RESV messages, because that method involves end-to-end RSVP checking for available resources and does not rely on other protocols for that function.

The RSVP messages are treated as any other data from the CE router, and placed on the appropriate LSP with the inner label designating the VPN. The P routers do not observe the RSVP messages. A PE router knows the capacity of the LSPs connected to it, because the PE router participates in the establishment of the LSPs using RSVP-TE or CR-LDP. When using RSVP-TE, a PE router can optionally increase the capacity of an LSP, if the links along the path are underutilized. A PE router can also decrease the capacity of an LSP, if the capacity is not needed, by using RSVP-TE. When there is sufficient capacity on an LSP for a particular VPN at a particular class of service, a call will be admitted and the PE aggregator function will increase the tally of resources in use by the amount required for the admitted call. The aggregator function in the PE router responds to RSVP TEAR messages by reducing the tally of resources in use.

The PE router enforces fairness among VPNs sharing the same LSP by counting the bandwidth consumed by each VPN for each of several classes of service (e.g., real-time voice class of service and premium data class of service) on each LSP. A configurable bandwidth minimum is reserved for each VPN and a configurable maximum bandwidth capacity is enforced for each VPN for each of several classes of service on each LSP.

Prior to the present invention, an LSP shared between two or more VPNs may have one of the VPNs consume a majority of the LSP bandwidth, thereby starving the other VPNs sharing the LSP. For example, referring again to FIG. 2, first VPN and third VPN share the same LSP from PE1 router 50 to PE4 router 56 (using the same segments and P routers). The LSP extends from PE1 router 50 to PE4 router 56 by way of segment 80, P1 router 60, segment 90, P2 router 62, segment 94, P4 router 66 and segment 86. Since under this scenario, the first VPN and the third VPN share the same LSP, the possibility exists that one of the VPNs (e.g. the first VPN) may utilize a majority of the bandwidth available to the LSP, while the other VPN (the third VPN) is not able to get sufficient bandwidth through the LSP for that VPNs (the third VPNs) data transfer.

By way of the present invention, this scenario is avoided. While the above description involved only two VPNs sharing a single LSP, it should be appreciated that an LSP may have sufficient bandwidth to handle a large number of VPNs before having to have an RESV rejected due to insufficient capacity to handle any additional traffic.

By way of the present invention, a service provider can provide a service level guarantee for a customer's VPN, since one VPN is prevented from using a substantial part of the capacity of another VPN sharing a common LSP. Accordingly, a service provider is able to provide a service level guarantee to customers for the amount of capacity available to the customer's VPN while still sharing an LSP with other customers' VPNs.

Figure 3:
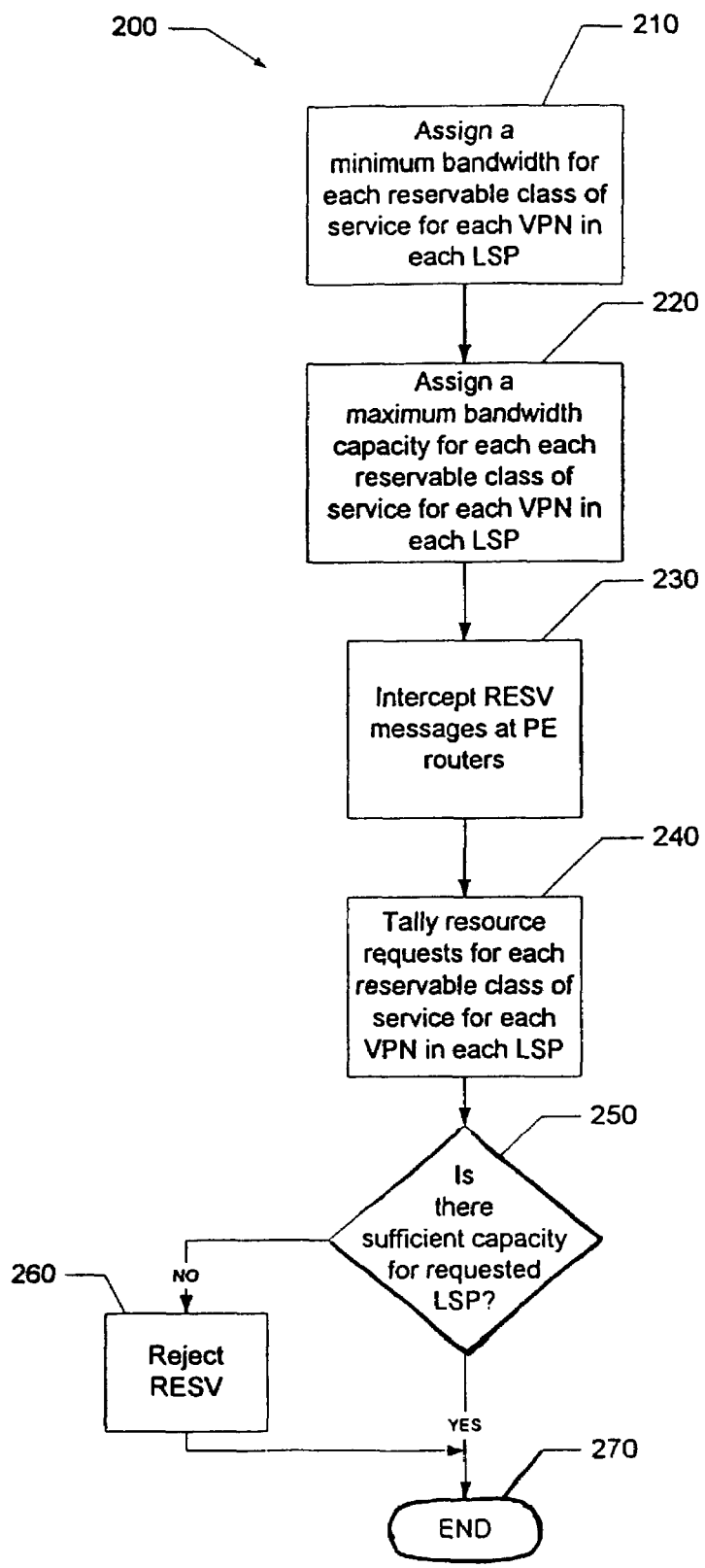
FIG. 3 is flow chart of the present method.

A flow chart of the present invention is shown in FIG. 3. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required to operate a distributed Raman amplifier in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

The method 200 begins at step 210, wherein a minimum bandwidth is assigned to each VPN for each reservable class of service. For example, the minimum bandwidth provides a guarantee that the LSP will be able to support a certain amount of multimedia traffic for each VPN.

At step 220 a maximum bandwidth capacity is assigned to each VPN for each reservable class of service for each LSP. This maximum bandwidth capacity defines the limit to the amount of traffic (corresponding to that class of service) that can be supported by the VPN on the designated LSP.

Step 230 defines the step wherein PE routers intercept RSVP (RESV or PATH) messages. The RSVP messages are sent by hosts through the CE routers and are used to determine whether bandwidth required for the multimedia data is available.

At the next step, step 240, the PE router tallies the requests for the LSPs. This step ensures that bandwidth requirements for the multimedia transfer will be available.

Following step 240, step 250 is executed wherein a determination is made, for each LSP and each reservable class of service, as to whether there is sufficient capacity associated with the VPN. If the VPN has insufficient capacity, such as the case when the LSP is being used in other transfers, then, as shown in step 260 the RESV is rejected. The call will be rejected if it would cause the total VPN bandwidth consumption to exceed the maximum capacity allowed for that VPN. The call will also be rejected if the LSP as a whole does not have enough additional capacity. If the VPN requiring additional bandwidth is not using its minimum capacity, but the total bandwidth requirement of the LSP would be exceeded, then call blocking will begin on other VPNs that are using more than their minimum allocations. On the other hand, if the LSP has available bandwidth capacity, then the RESV request is not rejected and the LSP is allocated to the associated multimedia transfer between two PE routers. Following execution of steps 260 or step 270 the process ends, as shown in step 270.

A method and system for providing fairness of capacity allocation in a network has been described. The method includes intercepting RSVP messages at a PE router and counting requests for LSPs, and rejecting requests when a VPN on a particular LSP has inadequate capacity. By way of the above-described method, a service provider is able to offer service level guarantees for customers. While the present invention was described using certain protocols, the method may be further applicable to other protocols.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of providing fairness of capacity allocation in a network comprising:
   intercepting Reservation (RESV) messages at a Provider Edge (PE) router;
   tallying requests for Labeled Switch Paths (LSPs) associated with said RESV messages;
   rejecting a RESV message when a Virtual Private Network (VPN) associated with a LSP has inadequate capacity to accommodate a request associated with said RESV message, wherein a minimum bandwidth capacity is assigned to each VPN for a specific LSP, and wherein a maximum bandwidth capacity is assigned to each VPN for a specific LSP; and
   dynamically adjusting the maximum bandwidth capacity assigned to each VPN for a specific LSP when resources are available.

2. A method of providing fairness of capacity allocation in a network comprising:
   intercepting Reservation (RESV) messages at a Provider Edge (PE) router;
   tallying requests for Labeled Switch Paths (LSPs) associated with said RESV messages; and
   rejecting a RESV message when a Virtual Private Network (VPN) associated with a LSP has inadequate capacity to accommodate a request associated with said RESV message, wherein a minimum bandwidth capacity is assigned to each VPN for a specific LSP, and wherein a maximum bandwidth capacity is assigned to each VPN for a specific LSP, wherein said PE router counts bandwidth consumed by each VPN for each of several classes of services on each LSP, wherein a configurable bandwidth minimum is reserved for each VPN, and wherein a configurable bandwidth maximum is enforced for each VPN for each of several classes of services on each LSP.

3. A method of providing fairness of capacity allocation in a network comprising:
   intercepting Reservation (RESV) messages at a Provider Edge (PE) router;
   tallying requests for Labeled Switch Paths (LSPs) associated with said RESV messages; and
   rejecting a RESV message when a Virtual Private Network (VPN) associated with a LSP has inadequate capacity to accommodate a request associated with said RESV message, wherein a minimum bandwidth capacity is assigned to each VPN for a specific LSP, wherein when the VPN requiring additional bandwidth is not using its minimum capacity, and the total bandwidth of the LSP could be exceeded, then call blocking will begin on other VPNs that are using more than their minimum allocations.

4. A system for providing fairness of capacity allocation in a network comprising:
   a plurality of Virtual Private Networks (VPNs); and
   a Service Provider Backbone (SPB) interconnecting said plurality of VPNs, said SPB including a plurality of Provider Edge (PE) routers for receiving information into said SPB and for transmitting information out of said SPB, a plurality of Labeled Switch Paths (LSPs) interconnecting said PE routers within said SPB, and wherein Reservation (RESV) messages are intercepted by said plurality of PE routers and requests for LSPs are tallied and a request is rejected when a VPN associated with an LSP has insufficient capacity to accommodate the request, wherein a minimum bandwidth capacity is assigned to each VPN for a specific LSP, and wherein a maximum bandwidth capacity is assigned to each VPN for a specific LSP, wherein the maximum bandwidth capacity of a VPN associated with an LSP is dynamically adjusted when resources are available.

5. A system for providing fairness of capacity allocation in a network comprising:
   a plurality of Virtual Private Networks (VPNs); and
   a Service Provider Backbone (SPB) interconnecting said plurality of VPNs, said SPB including a plurality of Provider Edge (PE) routers for receiving information into said SPB and for transmitting information out of said SPB, a plurality of Labeled Switch Paths (LSPs) interconnecting said PE routers within said SPB, and wherein Reservation (RESV) messages are intercepted by said plurality of PE routers and requests for LSPs are tallied and a request is rejected when a VPN associated with an LSP has insufficient capacity to accommodate the request, wherein a minimum bandwidth capacity is assigned to each VPN for a specific LSP, and wherein a maximum bandwidth capacity is assigned to each VPN for a specific LSP, wherein said PE router counts bandwidth consumed by each VPN for each of several classes of service on each LSP, wherein a configurable bandwidth minimum is reserved for each VPN, and wherein a configurable bandwidth maximum is enforced for each VPN for each of several classes of service on each LSP.

6. A system for providing fairness of capacity allocation in a network comprising:
   a plurality of Virtual Private Networks (VPNs); and
   a Service Provider Backbone (SPB) interconnecting said plurality of VPNs, said SPB including a plurality of Provider Edge (PE) routers for receiving information into said SPB and for transmitting information out of said SPB, a plurality of Labeled Switch Paths (LSPs) interconnecting said PE routers within said SPB, and wherein Reservation (RESV) messages are intercepted by said plurality of PE routers and requests for LSPs are tallied and a request is rejected when a VPN associated with an LSP has insufficient capacity to accommodate the request, wherein a minimum bandwidth capacity is assigned to each VPN for a specific LSP, wherein when the VPN requiring additional bandwidth is not using its minimum capacity, and the total bandwidth of the LSP could be exceeded, then call blocking will begin on other VPNs that are using more than their minimum allocations.

* * * * *